Patented June 20, 1950

2,511,957

UNITED STATES PATENT OFFICE 2,511,957

TETRALIN OXIDATION AND RECOVERY OF HYDROPEROXIDE FROM THE OXIDATION PRODUCT

John E. Wicklatz and Thomas J. Kennedy, Bartlesville, Okla., assignors to Phillips Petroleum Company, a corporation of Delaware No Drawing. Application April 25, 1949,
Serial No. 89,564

6 Claims. (Cl. 260—610)

This invention relates to the oxidation of tetralin. In one aspect this invention relates to the recovery of a hydroperoxide formed as a product of tetralin oxidation. In another aspect this invention relates to a process for the oxidation of tetralin to form tetralin-hydroperoxide product, comprised in a major proportion of 1,2,3,4-tetrahydronaphthalene-1-hydroperoxide, and to the recovery of tetralin hydroperoxide crystals of high purity from the oxidation product.

Various methods have been proposed for the oxidation of a hydrocarbon to the corresponding hydroperoxide. One well-known procedure for converting tetralin to a corresponding hydroperoxide product is the oxidation of tetralin with free oxygen of commercial grade purity, i. e., 90–95 per cent and higher, or with any suitable oxygen-containing gas, particularly air. Temperatures utilized in this procedure may be in the range of 50–150° C., although more often a temperature within a preferred range of about 60–90° C., is employed. Resulting tetralin hydroperoxide oxidation product is comprised chiefly of 1,2,3,4-tetrahydronaphthalene-1-hydroperoxide, and is often contacted with an aqueous alkali metal hydroxide at a temperature within the limits of 20–50° C. to form the corresponding tetralin hydroperoxide alkali metal salt, which may then be isolated by any suitable means. One such isolation procedure involves cooling the aqueous alkali metal salt-containing mixture to a temperature usually within the range of 0–20° C., under which conditions the alkali metal tetralin hydroperoxide salt crystalizes readily and completely. Alkali metal salt crystals thus formed may then be separated from the cooled aqueous crystal-containing solution, by vacuum filtration, and dried. Alkali metal salt, thus separated, is generally washed with liquid hydrocarbon, or other suitable solvent, to remove parent hydrocarbons and other soluble impurities, and then converted back to the free hydroperoxide by hydrolysis in an aqueous mineral acid solution. This hydrolysis is often conducted in the presence of aqueous sulfuric acid at a temperature in the range of 0–40° C. The hydrolysis product, rich in free tetralin hydroperoxide, contains minor amounts of impurities formed as by-product in the oxidation, salt-forming, and hydrolysis steps. The hydrolysis product, instead of being comprised of crystals of tetralin hydroperoxide of high purity, is a crude tetralin hydroperoxide-containing oil, referred to hereinafter as such, or even more simply, as "crude hydroperoxide oil."

Various methods have been proposed for the recovery of tetralin hydroperoxide crystals of high purity from the crude hydroperoxide oil, above discussed. However, most of these recovery procedures depend on distillation, or on well-known solvent extraction procedures, and are often inefficient and uneconomical.

This invention is concerned with a process for the recovery of tetralin hydroperoxide crystals of high purity from a crude hydroperoxide oil, formed as discussed hereabove.

An object of this invention is to provide for the recovery of a tetralin hydroperoxide from a product of tetralin oxidation.

Another object is to provide a novel solvent extraction process for the recovery of tetralin hydroperoxide crystals of high purity from a crude hydroperoxide-containing oil formed as described hereinabove.

Other objects will be apparent, to one skilled in the art, from the accompanying discussion and disclosure.

In accordance with one embodiment of this invention tetralin hydroperoxide crystals of high purity are recovered from a crude tetralin hydroperoxide-containing oil formed as described hereinabove, by extraction with one of two solvents, normal pentane and normal heptane, and the resulting extract separated. Any remaining tetralin hydroperoxide in the raffinate is then extracted with the other of the two solvents, and the extract separated. The two separate extracts are then combined and the combined extract mixture distilled. Preferably teralin hydroperoxide is extracted from the oil with normal heptane and from the raffinate with normal pentane. As the normal pentane is distilled from the combined extract mixture, the normal heptane becomes increasingly rich in tetralin hydroperoxide until tetralin hydroperoxide crystals begin to separate. At this point, distillation is terminated and the residual normal heptane concentrate is cooled, preferably to a temperature in the range of 0–20° C., under which conditions substantially all the tetralin hydroperoxide remaining in the concentrate is crystallized. The crystals may then be separated from the mother liquid by filtration.

In another embodiment of our invention, tetralin hydroperoxide is initially extracted from the crude hydroperoxide oil with normal pentane, and the extract separated. Normal heptane is then added to the resulting normal pentane extract. Crystalline tetralin hydroperoxide is then recovered from the normal pentane-normal heptane extract mixture by distillation and cooling, in exactly the same manner as discussed above for the recovery of tetralin hydroperoxide crystals from the combined extract mixture.

The quantities of normal heptane and normal pentane solvents employed in the practice of our invention may be varied by one skilled in the art in consideration of such variables as the extent of crystalline product recovery sought, and the concentration of the hydroperoxide in the oil and/or the raffinate. However, we find that it is generally advantageous to employ either of these solvents in a volume ratio to oil or raffinate, as the case may be, within the limits of 5:1 to 50:1, or higher if desired. When in our preferred embodiment, heptane is used in the first extraction, the volume of pentane subsequently employed is preferably greater than the volume of heptane, usually from 2 to 4 times greater.

Although we have found our novel solvent extraction process especially well applied to the recovery of tetralin hydroperoxide crystals from a crude hydroperoxide oil, of the type described hereinabove, our recovery process may also be applied to the recovery of hydroperoxide crystals from hydroperoxide-containing reaction mixtures of oxidation processes wherein other hydrocarbons are converted to a corresponding hydroperoxide, particularly aromatic hydrocarbons.

Although the tetralin oxidation described hereinabove proceeds in the absence of a catalyst, small amounts of preformed tetralin hydroperoxide may be added to the oxidation mixture to serve as an initiator for the oxidation reaction.

Our invention is illustrated by the following example. The reactants, their proportions, and other specific ingredients are presented as being typical and should not be construed to limit the invention unduly.

*Example*

A run was made wherein a mixture containing 100 parts by weight of freshly distilled tetralin and 0.4 part by weight of tetralin hydroperoxide was charged to a reactor and heated to 80° C. Oxygen of about 95 per cent purity was then contacted with the heated tetralin mixture with vigorous agitation to form tetralin hydroperoxide until the hydroperoxide content reached 25.2 grams per 100 ml. of reaction mixture. Oxidation was then stopped and the reactor contents were admixed with 50 parts by weight of a 25 per cent aqueous solution of sodium hydroxide to form the corresponding sodium salt of the hydroperoxide. The resulting sodium salt-containing reaction mixture was cooled to about 15° C. under which conditions the sodium salt crystallized. The salt was recovered by filtration and washed with pentane.

The crystalline sodium salt isolated in the manner described was converted back to the hydroperoxide by its solution in water and hydrolysis in the presence of dilute sulfuric acid. An oil product of hydrolysis containing free tetralin hydroperoxide was obtained. Tetralin hydroperoxide product was extracted from the oil with normal heptane added in a volume ratio to the oil of about 10:1 and the resulting normal heptane extract separated. Tetralin hydroperoxide remaining in the raffinate was then extracted with normal pentane using about 3 times as much pentane as heptane, and the resulting extract separated. The extracts were combined, and the combined extract mixture was dried over anhydrous calcium sulfate, and vacuum distilled at room temperature. When about 50 to 75 parts by weight of normal pentane remained to be distilled, crystals of tetralin hydroperoxide started to precipitate. At this point distillation was stopped and the kettle residue cooled to about 15° C. The remainder of the crystalline tetralin hydroperoxide then precipitated. The crystalline substance was isolated by suction filtration, washed with cooled heptane and dried over calcium chloride in a vacuum desiccator. Analysis of the crystalline product showed these crystals to be 99.8 per cent tetralin hydroperoxide.

As will be evident to those skilled in the art, various modifications of this invention can be made, or followed, in the light of the foregoing disclosure and discussion, without departing from the spirit or scope of the disclosure or from the scope of the claims.

We claim:

1. In a process for the oxidation of tetralin with free oxygen to form tetralin hydroperoxide, wherein tetralin hydroperoxide in a resulting oxidation product is converted to the corresponding alkali metal salt and said salt is recovered in crystalline form and then hydrolyzed to form a crude tetralin hydroperoxide-containing oil, the improvement comprising extracting tetralin hydroperoxide from said oil with one of two solvents of the group consisting of normal heptane and normal pentane, separating the extract, extracting tetralin hydroperoxide from the raffinate with the other of said two solvents and separating the extract, combining each said extract, and distilling normal pentane from the combined extract admixture until crystalline tetralin hydroperoxide is initially formed in residual distillation product, thereafter cooling said residual product and recovering crystalline tetralin hydroperoxide therefrom.

2. In a process for the oxidation of tetralin with free oxygen to form tetralin hydroperoxide, wherein tetralin hydroperoxide in a resulting oxidation product is converted to the corresponding alkali metal salt and said salt is recovered in crystalline form and then hydrolyzed to form a crude tetralin hydroperoxide-containing oil, the improvement comprising extracting tetralin hydroperoxide from said oil with normal heptane and separatinng the extract, extracting tetralin hydroperoxide from the raffinate with normal pentane and separating the extract, combining each said extract and distilling normal pentane from the combined extract admixture until crystalline tetralin hydroperoxide is initially formed in residual distillation product, thereafter cooling said residual product and recovering crystalline tetralin hydroperoxide therefrom.

3. The process of claim 2 wherein the volume ratio of normal heptane to said oil it not less than 5:1 and the volume of normal pentane is within the range of from 2 to 4 times the volume of said normal heptane.

4. In a process for the oxidation of tetralin with free oxygen to form tetralin hydroperoxide product, wherein tetralin hydroperoxide in a resulting oxidation product is converted to the corresponding alkali metal salt and said salt is recovered in crystalline form and then hydrolyzed to form a crude tetralin hydroperoxide-containing oil, the improvement comprising extracting tetralin hydroperoxide from said oil with normal pentane and separating the extract, admixing the separate extract with normal heptane and distilling normal pentane from the resulting normal heptane-normal pentane extract admixture until crystalline tetralin hydroperoxide is initially formed in residual distillation product, thereafter cooling said residual distillation product and then recovering crystalline tetralin hydroperoxide from same.

5. The process of claim 2 wherein said hydroperoxide is 1,2,3,4-tetrahydronaphthalene-1-hydroperoxide.

6. In a process for the oxidation of tetralin with free oxygen to form tetralin hydroperoxide product, wherein tetralin hydroperoxide in a resulting oxidation product is converted to the corresponding alkali metal salt and said salt is recovered in crystalline form and then hydrolyzed to form a crude tetralin hydroperoxide-containing oil, the improvement comprising extracting tetralin hydroperoxide from said oil with one of two solvents of the group consisting of normal heptane and normal pentane and separating the extract, distilling said extract in the presence of the other of said two solvents until crystalline tetralin hydroperoxide is initially formed in residual distillation product, cooling said residual distillation product and then recovering crystalline tetralin hydroperoxide therefrom.

JOHN E. WICKLATZ.
THOMAS J. KENNEDY.

No references cited.